United States Patent
Rappaport et al.

(10) Patent No.: US 10,873,644 B1
(45) Date of Patent: Dec. 22, 2020

(54) WEB APPLICATION WRAPPER

(71) Applicant: Microsoft Technology Licensing, LLC, Redmond, WA (US)

(72) Inventors: Nir Mardiks Rappaport, Bellevue, WA (US); Vikas Malik, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/448,952

(22) Filed: Jun. 21, 2019

(51) Int. Cl.
 *G06F 15/16* (2006.01)
 *H04L 29/08* (2006.01)
 *H04L 29/12* (2006.01)

(52) U.S. Cl.
 CPC ........ *H04L 67/2814* (2013.01); *H04L 61/106* (2013.01); *H04L 67/2895* (2013.01)

(58) Field of Classification Search
 CPC .. H04L 67/281; H04L 61/106; H04L 67/2895
 See application file for complete search history.

(56) References Cited

U.S. PATENT DOCUMENTS

| | | | | |
|---|---|---|---|---|
| 7,818,435 | B1* | 10/2010 | Jellinek | H04L 67/2895 709/229 |
| 9,864,735 | B1* | 1/2018 | Lamprecht | G06F 16/958 |
| 2002/0007393 | A1* | 1/2002 | Hamel | G06Q 30/0277 709/203 |
| 2005/0008016 | A1* | 1/2005 | Shimozono | G06F 16/1824 370/392 |
| 2008/0183902 | A1* | 7/2008 | Cooper | H04L 67/2823 709/250 |
| 2009/0031382 | A1* | 1/2009 | Cope | G06F 16/70 725/115 |
| 2009/0083646 | A1* | 3/2009 | Lin | G06F 16/9577 715/769 |
| 2009/0307571 | A1* | 12/2009 | Gowda | G06F 16/00 715/202 |
| 2010/0228963 | A1* | 9/2010 | Kassab | G06Q 30/02 713/150 |
| 2012/0089481 | A1* | 4/2012 | Iozzia | G06F 21/606 705/26.41 |
| 2013/0311863 | A1* | 11/2013 | Gutkin | G06F 16/9566 715/208 |
| 2015/0135302 | A1* | 5/2015 | Cohen | H04L 41/5032 726/12 |
| 2016/0077824 | A1* | 3/2016 | Vishnepolsky | H04L 67/1002 717/172 |
| 2019/0098096 | A1 | 3/2019 | Mocanu et al. | |

OTHER PUBLICATIONS

"International Search Report and Written Opinion Issued in PCT Application No. PCT/US2020/031547", dated Jul. 15, 2020, 11 Pages.

\* cited by examiner

*Primary Examiner* — Hieu T Hoang
(74) *Attorney, Agent, or Firm* — Dicke, Billig & Czaja, PLLC

(57) ABSTRACT

A proxy server to retrieve a web address received from a client to a webserver is disclosed. The proxy server can include a reverse proxy server. The web address is converted into proxy address at the proxy server. The proxy address is wrapped into a wrapper domain with a wrapping frame.

20 Claims, 3 Drawing Sheets

WEB APPLICATION WRAPPER

BACKGROUND

Cloud computing is a model of service delivery for enabling convenient, on-demand network access to a shared pool of configurable computing resources that can be rapidly generated and released with nominal management effort or interaction with a provider of the service. Cloud computing allows a cloud consumer to obtain computing resources, such as networks, network bandwidth, servers, processing memory, storage, applications, virtual machines, and services as a service on an elastic and sometimes impermanent basis. Cloud computing platforms and infrastructures allow developers to build, deploy, and manage assets and resources for applications. Cloud computing may include security services that can protect resource and assets from attack.

SUMMARY

This summary is provided to introduce a selection of concepts in a simplified form that are further described below in the Description. This summary is not intended to identify key features or essential features of the claimed subject matter, nor is it intended to be used to limit the scope of the claimed subject matter.

Cloud computing environments can include security services such as cloud access security broker that can enforce policies and log session data between a user and a web application. The present disclosure is directed to a proxy server implementing a web address wrapper system to receive a web address, such as a web address web site or the web application, from a client to a webserver. The proxy server can include a reverse proxy server. The web address is converted into proxy address at the proxy server. The proxy address is wrapped into a wrapper domain with a wrapping frame. The proxy address can include a proxy domain or suffix domain that corresponds with the proxy server or the security service implemented with the proxy server. The wrapper domain can correspond with a tenant of the security service. In one example, the wrapping frame includes an inline frame. The client can navigate the web address relative to the wrapper domain. For instance, the client can navigate to web addresses of various web pages or files of a web site or web application relative to the wrapper domain. The web page can be loaded into or inside an inline frame.

BRIEF DESCRIPTION OF THE DRAWINGS

The accompanying drawings are included to provide a further understanding of embodiments and are incorporated in and constitute a part of this disclosure. The drawings illustrate embodiments and together with the description serve to explain principles of embodiments. Other embodiments and many of the intended advantages of embodiments will be readily appreciated, as they become better understood by reference to the following description. The elements of the drawings are not necessarily to scale relative to each other. Like reference numerals designate corresponding similar parts.

DESCRIPTION

In the following Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following description, therefore, is not to be taken in a limiting sense. It is to be understood that features of the various example embodiments described herein may be combined, in part or whole, with each other, unless specifically noted otherwise.

Figure 1:
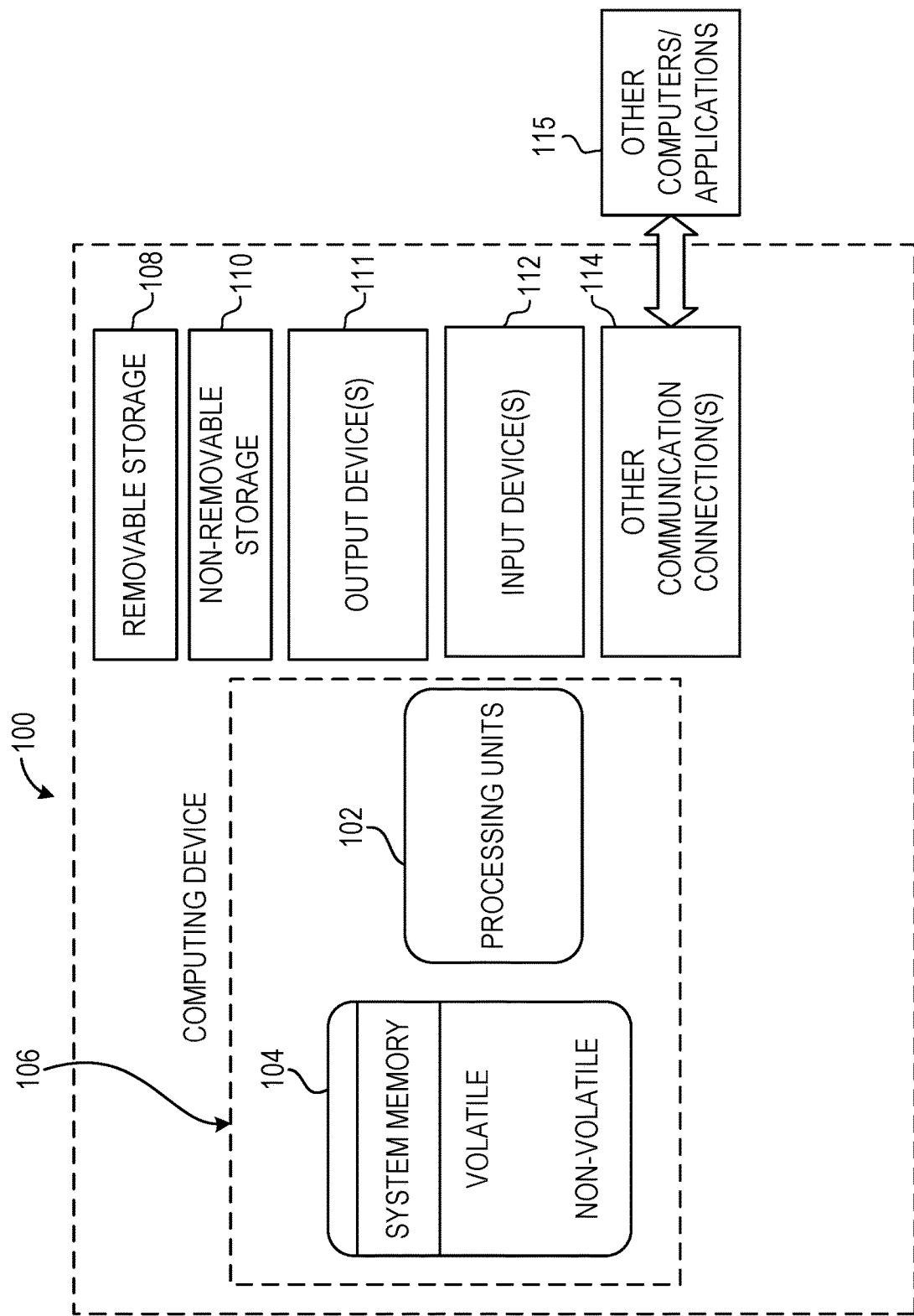
FIG. 1 is a block diagram illustrating an example of a computing device, which can be configured in a computer network to provide, for example, a cloud-computing environment.

FIG. 1 illustrates an exemplary computer system that can be employed in an operating environment and used to host or run a computer application included on one or more computer readable storage mediums storing computer executable instructions for controlling the computer system, such as a computing device, to perform a process. The exemplary computer system includes a computing device, such as computing device 100. The computing device 100 can take one or more of several forms. Such forms include a tablet, a personal computer, a workstation, a server, a handheld device, a consumer electronic device (such as a video game console or a digital video recorder), or other, and can be a stand-alone device or configured as part of a computer network.

In a basic hardware configuration, computing device 100 typically includes a processor system having one or more processing units, i.e., processors 102, and memory 104. By way of example, the processing units may include two or more processing cores on a chip or two or more processor chips. In some examples, the computing device can also have one or more additional processing or specialized processors (not shown), such as a graphics processor for general-purpose computing on graphics processor units, to perform processing functions offloaded from the processor 102. The memory 104 may be arranged in a hierarchy and may include one or more levels of cache. Depending on the configuration and type of computing device, memory 104 may be volatile (such as random access memory (RAM)), nonvolatile (such as read only memory (ROM), flash memory, etc.), or some combination of the two.

Computing device 100 can also have additional features or functionality. For example, computing device 100 may also include additional storage. Such storage may be removable or non-removable and can include magnetic or optical disks, solid-state memory, or flash storage devices such as removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media. Computer storage media includes RAM, ROM, EEPROM, flash memory or other memory technology, CD-ROM, digital versatile discs (DVD) or other optical storage, magnetic cassettes, magnetic tape, magnetic disk storage or other magnetic storage devices, universal serial bus (USB) flash drive, flash memory card, or other flash storage devices, or any other storage medium that can be used to store the desired information and that can be accessed by computing device 100. Accordingly, a propagating signal by itself does not qualify as storage media. Any such computer storage media may be part of computing device 100.

Computing device 100 often includes one or more input and/or output connections, such as USB connections, display ports, proprietary connections, and others to connect to various devices to provide inputs and outputs to the computing device. Input devices 112 may include devices such as keyboard, pointing device (e.g., mouse, track pad), stylus, voice input device, touch input device (e.g., touchscreen), or other. Output devices 111 may include devices such as a display, speakers, printer, or the like.

Computing device 100 often includes one or more communication connections 114 that allow computing device 100 to communicate with other computers/applications 115. Example communication connections can include an Ethernet interface, a wireless interface, a bus interface, a storage area network interface, and a proprietary interface. The communication connections can be used to couple the computing device 100 to a computer network, which can be classified according to a wide variety of characteristics such as topology, connection method, and scale. A network is a collection of computing devices and possibly other devices interconnected by communications channels that facilitate communications and allows sharing of resources and information among interconnected devices. Examples of computer networks include a local area network, a wide area network, the internet, or other network.

In one example, one or more of computing device 100 can be configured as a client device for a user in the network. The client device can be configured to establish a remote connection with a server on a network in a computing environment. The client device can be configured to run applications or software such as operating systems, web browsers, cloud access agents, terminal emulators, or utilities.

In one example, one or more of computing devices 100 can be configured as servers in a datacenter to provide distributed computing services such as cloud computing services. A data center can provide pooled resources on which customers or tenants can dynamically provision and scale applications as needed without having to add servers or additional networking. The datacenter can be configured to communicate with local computing devices such used by cloud consumers including personal computers, mobile devices, embedded systems, or other computing devices. Within the data center, computing device 100 can be configured as servers, either as stand alone devices or individual blades in a rack of one or more other server devices. One or more host processors, such as processors 102, as well as other components including memory 104 and storage 110, on each server run a host operating system that can support multiple virtual machines. A tenant may initially use one virtual machine on a server to run an application. The datacenter may activate additional virtual machines on a server or other servers when demand increases, and the datacenter may deactivate virtual machines as demand drops.

Datacenter may be an on-premises, private system that provides services to a single enterprise user or may be a publicly (or semi-publicly) accessible distributed system that provides services to multiple, possibly unrelated customers and tenants, or may be a combination of both. Further, a datacenter may be a contained within a single geographic location or may be distributed to multiple locations across the globe and provide redundancy and disaster recovery capabilities. For example, the datacenter may designate one virtual machine on a server as the primary location for a tenant's application and may activate another virtual machine on the same or another server as the secondary or back-up in case the first virtual machine or server fails.

A cloud-computing environment is generally implemented in one or more recognized models to run in one or more network-connected datacenters. A private cloud deployment model includes an infrastructure operated solely for an organization whether it is managed internally or by a third-party and whether it is hosted on premises of the organization or some remote off-premises location. An example of a private cloud includes a self-run datacenter. A public cloud deployment model includes an infrastructure made available to the general public or a large section of the public such as an industry group and run by an organization offering cloud services. A community cloud is shared by several organizations and supports a particular community of organizations with common concerns such as jurisdiction, compliance, or security. Deployment models generally include similar cloud architectures, but may include specific features addressing specific considerations such as security in shared cloud models.

Cloud-computing providers generally offer services for the cloud-computing environment as a service model provided as one or more of an infrastructure as a service, platform as a service, and other services including software as a service. Cloud-computing providers can provide services via a subscription to tenants or consumers. For example, software as a service providers offer software applications as a subscription service that are generally accessible from web browsers or other thin-client interfaces, and consumers do not load the applications on the local computing devices. Infrastructure as a service providers offer consumers the capability to provision processing, storage, networks, and other fundamental computing resources where the consumer is able to deploy and run software, which can include operating systems and applications. The consumer generally does not manage the underlying cloud infrastructure, but generally retains control over the computing platform and applications that run on the platform. Platform as a service providers offer the capability for a consumer to deploy onto the cloud infrastructure consumer-created or acquired applications created using programming languages, libraries, services, and tools supported by the provider. In some examples, the consumer does not manage or control the underlying cloud infrastructure including network, servers, operating systems, or storage, but has control over the deployed applications and possibly configuration settings for the application-hosting environment. In other examples, the provider can offer a combination of infrastructure and platform services to allow a consumer to manage or control the deployed applications as well as the underlying cloud infrastructure. Platform as a service providers can include infrastructure, such as servers, storage, and networking, and also middleware, development tools, business intelligence services, database management services, and more, and can be configured to support the features of the application lifecycle including one or more of building, testing, deploying, managing, and updating.

Figure 2:
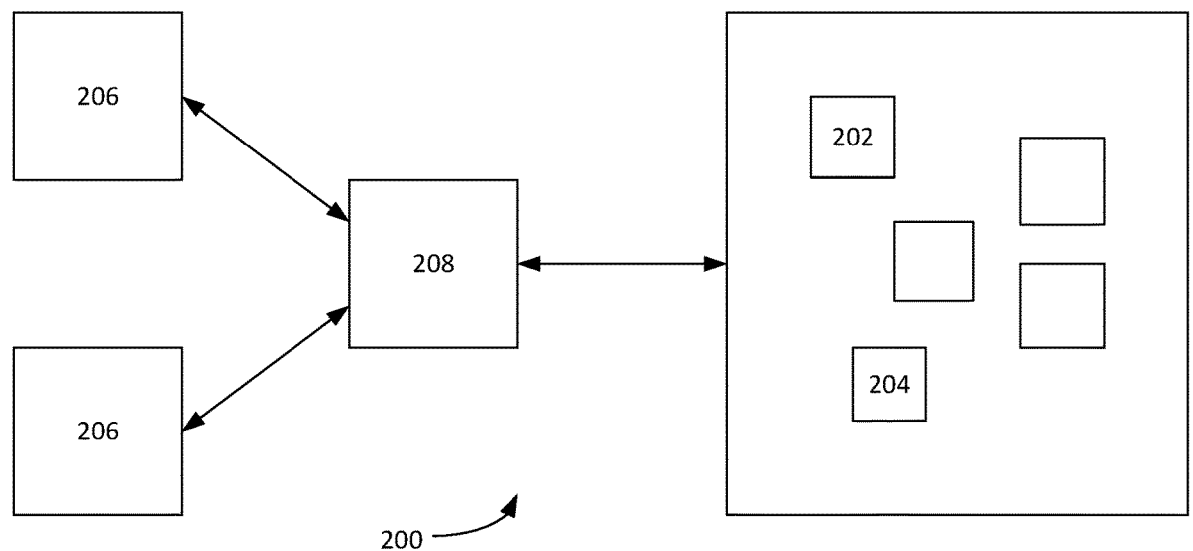
FIG. 2 is a schematic diagram illustrating an example a cloud-computing environment.

FIG. 2 illustrates an example a computer network 200 such cloud-computing environment to deploy a web pages 202, such as dynamic web pages, which can include web applications 204, on web servers to be accessed by users on a client device 206. In the illustrated example, the network 200 includes a security service 208, which may include a security broker such as a cloud access security broker, disposed to process network traffic between client devices 206 and web applications 204. A web application 204 is a software application that runs on a remote server. In many cases, a web browser on the client device 206 is used to access and implement web applications 204, over the network 200, such as the internet.

In one example, the web application 204 can be configured as a software as a service application, or SaaS. SaaS is a software model in which software is licensed on a subscription basis and is centrally hosted. SaaS is typically accessed by users using a thin client, e.g. via a web browser application on a computing device, such as computing device 100. SaaS has become a common delivery model for many business applications. SaaS applications are also known as web-based software, on-demand software and hosted software. Many SaaS applications are based on a multitenant architecture in which a single version of the application, with a single configuration such as hardware, network, and operating system, is used for all customers, or tenants. To support scalability, the application is installed on multiple machines or horizontally scaled, in an environment such as a datacenter or multiple datacenters. This is contrasted with a more traditional application architecture, in which multiple physical copies of the software, which may include different versions, or different configurations, are installed across various customer sites such as on different computing devices of the enterprise. Some SaaS applications do not use multitenancy, or may use other mechanisms such as virtualization to cost-effectively manage a large number of customers in place of multitenancy. SaaS applications have become popular with standardization of web page technologies (such as HTML, JavaScript, and CSS) and the introduction and ubiquity of web application frameworks that have gradually reduced the cost of developing SaaS solutions.

In some examples, SaaS applications can involve access to or integration with customer current data, and in cases when such data are large in volume or sensitive, integrating the data with remotely hosted software can be costly or risky, or can conflict with data governance regulations.

Security service 208, such as a cloud access security broker, provides services between the user 206 and the web application 204. In one example, the security service 208 may support multiple users of an enterprise, such as users 206 to access multiple SaaS applications, such as web application 204, subscribed to or otherwise accessed by the enterprise. In some examples, security service 208 may be deployed on premises or accessed via a cloud service. In one example, the security service 208 may support multiple enterprises accessing one or more sets of SaaS applications in a multitenancy model. Security service 208 can monitor activity between users 206 and the web applications 204 and enforce security policies. For example, a cloud access security broker can monitor user activity, warn administrators about potentially hazardous actions, enforce security policy compliance, and automatically prevent or reduce the likelihood of malware in the enterprise.

In one example, the security service 208 is a distributed, cloud-based proxy that is an inline broker for user and application activity. For valid applications, the security service tethers itself to the web application 204 through configuration changes in the application, and request made by a user 206 to the application are directed to the proxy for control and management. The security service 208 can apply authentication information within the architecture to track the identity of the users 206 and the accessed web applications 204. For example, the security service 208 can operate as a reverse proxy at the authentication or traffic level to create a redirection from the web application 204. Users 206 are directed to the web applications 206 through the security service 208 via a reverse proxy rather than directly between the user 206 and the web application 204. User requests and web application responses travel through the security service 208 during a session. For example, after authentication of a user 206 to a valid web application 204 served by the security service 206, the security service may replace web links to the web application 204 with domains of the security service 208 to keep the user within a session. The security service 208 may append the security domains link to a link of the web application to keep relevant links, cookies, and scripts within the session. In one example, the security service 208 can save session activities into a log and enforce policies of the session.

Figure 3:
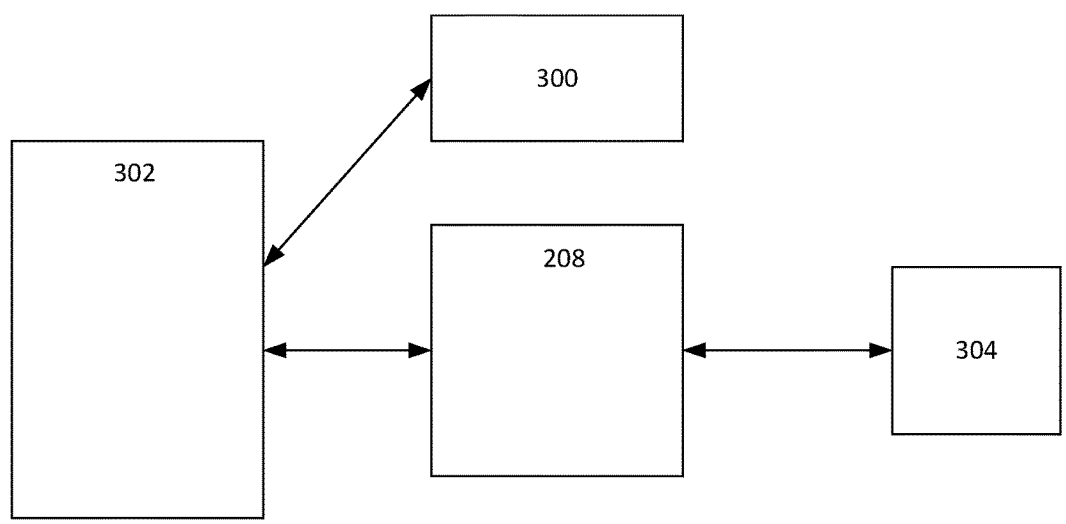
FIG. 3 is a schematic diagram illustrating an example web application wrapper system, which can be included in the cloud computing environment of FIG. 2.

FIG. 3 illustrates a web address wrapper system 300, which in one example can be incorporated into security service 208. In another example, the wrapper system 300 can be a standalone system that is hosted independently of the security service 208. The wrapper system 300 can include a computer readable storage device to store computer executable instructions to control a processor, such as a server in a datacenter. In one example, wrapper system 300 can be implemented as a computer program to run a processor as part of a proxy server, such as a reverse proxy server, to direct traffic between a client 302 and a web application server 304 such as in security service 208. For instance, the wrapper system 300 can direct traffic related to a web application run on the client 302 and the web server 304.

In the example, the web application server 304 hosts a web address that is reference to a web resource, which specifies the location of a web page on computer network such as the computer network 200. In one example, the web address of https://www.myapp.com/page/from/myapp indicates a protocol (HTTPS, or Hypertext Transfer Protocol Secure), a host name (www.myapp.com), and a file path (page/from/myapp). The web address can conform to a syntax of a generic universal resource indicator. The client 302 can include a web browser, which can receive the web address and communicate with the web server 304 that hosts a web page corresponding with the web address. The web 304 can load a web page corresponding with the web address into the browser at the client 302. In one example, the web page can be part of a web site having a set of pages indexed by the file path and included as part of a web application, such as an asynchronous web application. In one example, the web application can send and retrieve data between the client 302 and the web server 304 asynchronously without interfering generally with the display and behavior of the page in the web browser of the client 302.

The security service 208, operating as a reverse proxy server, receives the web address from the client intended for the corresponding web server appended with some proxy suffix such as "us.cas.ms", and forwards it to the original designated address. For example, a security service available under the trade designation Microsoft Cloud Access Security from Microsoft Corporation of Redmond, Wash., may convert the web address with a domain including www.myapp.com into a proxy address with a suffix domain of www.myapp.com.cas.ms. In this example, the web address is appended with a domain of the security service 208, or suffix domain, such as us.cas.ms to form the proxy address or suffix domain address. The domain of the security service 208 keeps users of the security service within a session that directs users through the security service 208, such as the proxy server, instead of directly between to the web server 304. The relevant web addresses, JavaScripts, and cookies within the web application 204 are replaced with proxy addresses.

The wrapper system 300 wraps the proxy address into a wrapper domain with a wrapper frame. In an example in which the user may be included as part of a tenant of the security service 208, the tenant having a brand name or a domain name of "Contoso," the proxy address of www.myapp.com.us.cas.ms may be provided with a wrapper domain address of www.myapp.contoso.com, which may be visible in the user's browser as the user navigates the web site or web application. In one example, a reverse proxied web address is wrapped in another inline frame. For instance, system 300 will wrap the suffixed web application inside a wrapper frame, such as an inline frame or iframe. Users of the web application will navigate to pages relative to wrapper-domain. The wrapping frame converts the web address relative to the suffixed domain and loads it inside an inline frame.

The use of the brand name or tenant domain name in the wrapping frame may confer an added degree of trust to the user that the security service 208 is operational. Additionally, the wrapper system can address a context-loss issue, and the context-loss issue can be manifested in architectures in which web applications are accessed via a proxy server. In an example of the context-loss issue, a path such as www.myapp.com/targetdocument is often stored as a cookie of the target web application. When a suffix proxy solution is applied to access the target web application in a session, the context of the target document cannot typically be restored without the cooperation of the target web application, which can make difficult the use of the suffix proxy solution with many web applications. The wrapper system 300 addresses the context-loss issue alters the way the web application is accessed because the user browses the web application through the cooperating end point.

The wrapper system 300 determines the appropriate wrapper domain to apply to the proxy address, which can be based on a subscription to a security service 208. In one example, the security service 208 can serve many tenants, each having a set of users, and each tenant can be served by the same domain of the proxy service, such as us.cas.ms to form the proxy address. The security service can apply a single domain of the proxy service. Each tenant, however, may include a corresponding wrapper domain, and the security service can apply a wrapper domain corresponding with the tenant.

In one example, the wrapping frame includes an inline frame, or iframe (<iframe>), which allows one Hypertext Markup Language (HTML) document to be embedded within another HTML document. In one example, the proxy address is wrapped in an inline frame. The user will navigate to pages of the web application relative to the wrapper domain. In an example provided for illustration, the web address of www.myapp.com/page/from/myapp will read www.myapp.contoso.com/#page/from/myapp in the browser. The wrapping frame converts the web address relative to a suffix domain of www.myapp.com.us.cas.ms/page/from/myapp and loads it into inside of an iframe. Other examples are contemplated. As the user navigates to other pages within the web site or web application, the wrapper domain address is kept in synchronization with the wrapped suffix address, or proxy address, and the wrapped proxy address is kept in synchronization with the wrapper domain address.

Figure 4:
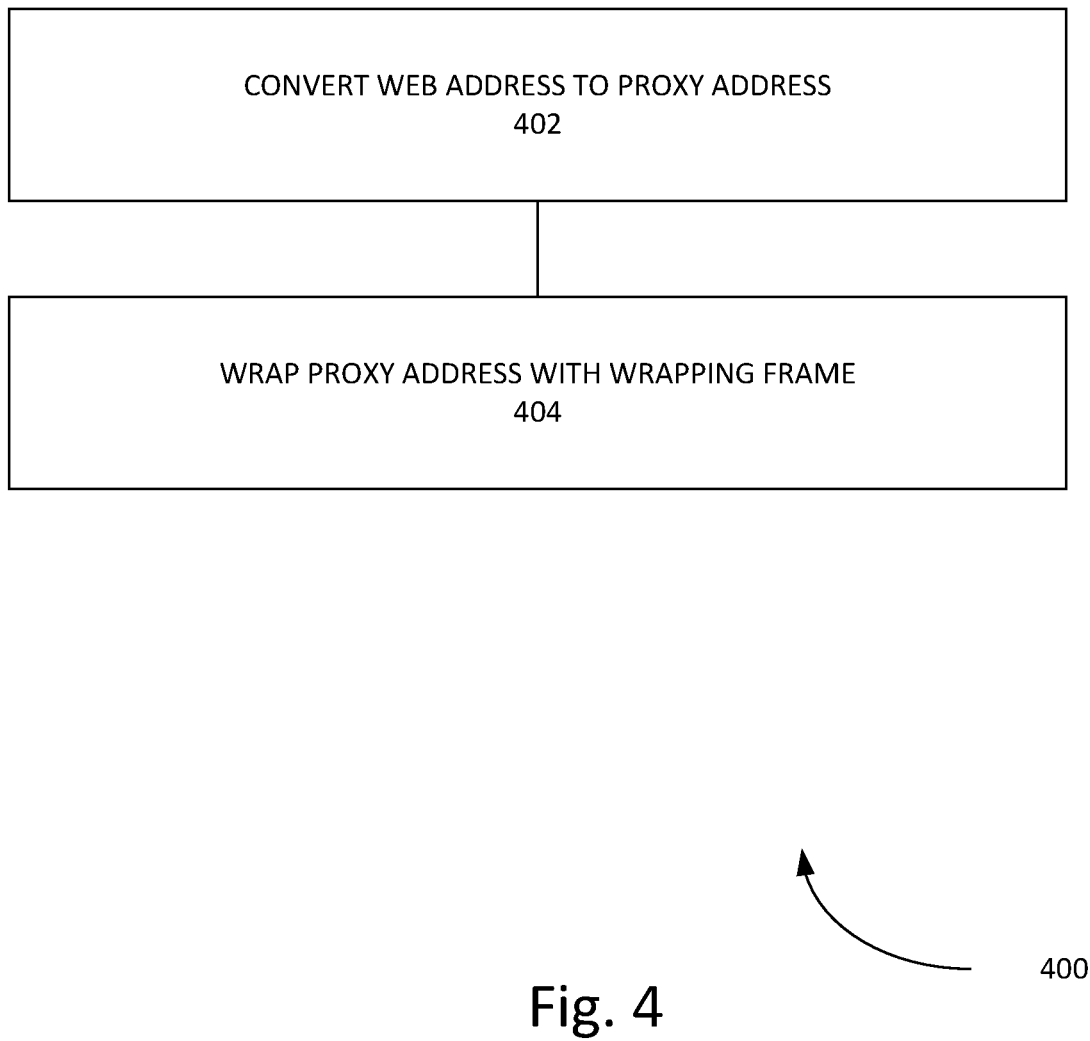
FIG. 4 is a block diagram illustrating an example method of the web application wrapper system of FIG. 3.

FIG. 4 illustrates an example method 400 that can be used by the proxy server implementing the web address wrapper system 300. The proxy server receives a web address from a client 302 to a webserver 304 and converts the web address into a proxy address at 402. The proxy server wraps the proxy address into a wrapper domain with a wrapping frame at 404. In one example, the proxy address can provide a proxy domain or suffix domain that corresponds with the proxy server or security service 208 implemented with the proxy server. In one example, the wrapper domain can correspond with a tenant of the security service, and the security service may implement a plurality of different wrapper domains. In one example, the wrapping frame includes an inline frame. The client can navigate the web address relative to the wrapper domain. For example, the client can navigate to web addresses of various web pages or files of a web site or web application relative to the wrapper domain. The web page can be loaded into or inside an inline frame.

The example system 300 and method 400 can be implemented to include a combination of one or more hardware devices and computer programs for controlling a system, such as a computing system having a processor and memory, to perform method 400 For instance, system 300 and method 400 can be implemented as a computer readable medium or computer readable storage device having set of executable instructions for controlling the processor to perform the method 400. The system 300 and method 400 can be included as a service in a cloud environment, such as a security service implementing a cloud access security broker to enforce security polices, and implemented on a computing device 100 in a datacenter as a proxy server, such as a reverse proxy server, to direct web traffic between a client 302 and a web server 304.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein.

What is claimed is:

1. A method of retrieving a web address with a proxy server, the proxy server receiving the web address from a client to a webserver, the method comprising:
    converting the web address into proxy address at the proxy server; and
    wrapping the proxy address into a wrapper domain with a wrapping frame.

2. The method of claim 1 wherein the proxy server is a reverse proxy server.

3. The method of claim 1 wherein the proxy server directs traffic between the client and the webserver.

4. The method of claim 1 wherein the proxy address is an address of a security service.

5. The method of claim 4 wherein the wrapper domain corresponds with a tenant of the security service.

6. The method of claim 1 wherein the web address corresponds with a web application.

7. The method of claim 1 wherein the client navigates the web address relative to the wrapper domain.

8. The method of claim 7 wherein the wrapping frame converts the proxy address relative to the wrapper domain of a suffix domain.

9. The method of claim 8 wherein the wrapper domain is synchronized with the suffix domain.

10. The method of claim 1 wherein the wrapper domain is loaded as a web page into an inline frame.

11. A computer readable storage device to store computer executable instructions to control a processor to:
   convert a web address received from a client to a webserver into proxy address at a proxy server; and
   wrap the proxy address into a wrapper domain with a wrapping frame.

12. The computer readable storage device of claim 11 wherein the instructions to wrap the proxy address with a wrapping frame includes an inline frame.

13. The computer readable storage device of claim 12 wherein the instructions to wrap the proxy address include loading the web address inside an inline frame.

14. The computer readable storage device of claim 11 including instructions to navigate the web address relative to the wrapper domain.

15. A system, comprising:
   a memory device to store a set of instructions; and
   a processor to execute the set of instructions to:
      convert a web address received from a client to a webserver into proxy address at a proxy server; and
      wrap the proxy address into a wrapper domain with a wrapping frame.

16. The system of claim 15 wherein the instructions are implemented with a security service.

17. The system of claim 16 wherein the security service is a cloud access security broker.

18. The system of claim 17 wherein the cloud access security broker enforces security policies.

19. The system of claim 16 wherein the security service logs access of the webserver.

20. The system of claim 15 wherein the proxy server is a reverse proxy server to direct web traffic between the client and the webserver.

* * * * *